(12) United States Patent
Waltermann

(10) Patent No.: US 6,356,925 B1
(45) Date of Patent: Mar. 12, 2002

(54) CHECK DIGIT METHOD AND SYSTEM FOR DETECTION OF TRANSPOSITION ERRORS

(75) Inventor: Rod David Waltermann, Rougemont, NC (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/268,915

(22) Filed: Mar. 16, 1999

(51) Int. Cl.⁷ .................................................. G06F 7/00
(52) U.S. Cl. ............................................................ 708/212
(58) Field of Search ................................ 708/212, 520, 708/607

(56) References Cited

U.S. PATENT DOCUMENTS

| | | | |
|---|---|---|---|
| 3,544,776 A | 12/1970 | Fischer | 235/153 |
| 3,582,636 A | 6/1971 | Bertram | 235/153 |
| 4,329,572 A | 5/1982 | Lovrich et al. | 235/92 EC |
| RE34,100 E | 10/1992 | Hartness | 371/40.1 |
| 5,252,077 A | 10/1993 | Schott | 434/335 |
| 5,428,210 A | 6/1995 | Nair et al. | 235/375 |
| 5,657,331 A * | 8/1997 | Metzner et al. | 714/762 |
| 5,905,739 A * | 5/1999 | Piret et al. | 714/752 |

FOREIGN PATENT DOCUMENTS

JP   3155980   7/1991 ............ B41K/3/10

OTHER PUBLICATIONS

SU1030852 A—Abstract only.
SU1084813 A—Abstract only.
3,460,117—Abstract only.
IEEE, 38th Midwest Symposium on Circuits and Systems—Abstract only.
IEEE, Proceedings of the Third Australian and New Zealand Conference on Intelligent Information Systems—Abstract only.
IEEE, Proceedings 1995 URSI International Symposium on Signals, Systems, and Electrons—Abstract only.
IBM Technical Disclosure Bulletin, vol. 19, No. 12, May 1997, Check Digit Printer, pp. 4693.
IBM Technical Disclosure Bulletin, vol. 22, No. 10, Mar. 1980, Self–Checking Number Verification and Repair Techniques, pp. 4673–4676.
IBM Technical Disclosure Bulletin, vol. 28, No. 3, Aug. 1985, Data Compression for Check Reader/Sorter Application, 903–905.

* cited by examiner

*Primary Examiner*—Tan V. Mai
(74) *Attorney, Agent, or Firm*—Bracewell & Patterson, LLP; J. Bruce Schelkopf

(57) ABSTRACT

A method and system for obtaining a check digit to identify a given numeric sequence of n digits and to verify the accuracy of subsequent entries of the numeric sequence. First, a numeric sequence of n digits is distributed among elements of at least two matrices. Next, the matrices are multiplied together, thereby obtaining a resultant matrix having m elements. Finally, a check digit is derived from the m elements of the resultant matrix, which may be utilized to identify the numeric sequence and verify the accuracy of subsequent entries of the numeric sequence.

15 Claims, 4 Drawing Sheets

$$A = \begin{bmatrix} d_{20} & d_7 & d_{14} & d_{11} \\ d_{10} & d_{15} & d_3 & d_{19} \\ d_{18} & d_8 & d_4 & d_{16} \end{bmatrix} \quad B = \begin{bmatrix} 1 & 1 & 1 \\ d_{21} & d_2 & d_{13} \\ d_{12} & d_{17} & d_9 \\ d_1 & d_5 & d_6 \end{bmatrix} \quad C = \begin{bmatrix} c_{11} & c_{12} & c_{13} \\ c_{21} & c_{22} & c_{23} \\ c_{31} & c_{32} & c_{33} \end{bmatrix}$$

$$(\Sigma c_{ij} \, (10i + j)) \; MOD \; P$$

CHECK DIGIT METHOD AND SYSTEM FOR DETECTION OF TRANSPOSITION ERRORS

BACKGROUND OF THE INVENTION

1. Technical Field

The present invention relates in general to an improved method and system for verifying the accuracy of a numerical sequence. In particular, the present invention relates to a method and system for acquiring a check digit associated with a numeric sequence. More particularly, the present invention relates to an improved check digit method and system that utilize non-commutative matrix multiplication of digits within a numeric sequence to enhance detection of transposition errors.

2. Description of the Related Art

When a sequence of numbers is generated, either by machine or otherwise, and that sequence must later be transcribed and re-entered, transposition errors due to human error or neglect are a significant possibility. In general, transposition errors involve unintentionally "reordering" a particular numeric sequence, such that pairs of digits, or pairs of digit fields, are switched when a given sequence is transcribed or re-entered. An example of a transposition error is illustrated in the following scenario. A numeric sequence "2 3 3 4 6 5", with corresponding digit places "d1 d2 d3 d4 d5 d6", is initially generated. Each digit position may be an information field signifying encoded information, for example. If a person transcribes this sequence from its original display (a computer display screen, for example) onto another medium, he or she may inadvertently switch the numbers in the first two digit positions resulting in an erroneous transcribed sequence of "3 2 3 4 6 5" in which digits "d1" and "d2" have been transposed.

Check digits are often appended to the end of numeric sequences to enable automatic verification of the accuracy of re-entries of such sequences. There are several known methods for generating and utilizing check digits to identify and verify numeric sequences. Among current check digit methods are "check sum", "ISBN check", and "IBM Check". Although there is some variation among these current check digit methods, they all utilize some form of modulated weighted sum to derive a check digit. Although each of these methods are effective when utilized to detect "misread" errors (those in which a digit within a sequence is simply replaced by an incorrect digit), they are not designed to detect certain transposition errors. As described above, a transposition error involves switching pairs of digits or entire fields within a numeric sequence. Most transposition errors may effectively be detected by current check digit methods. However, check digits which are derived from multiplication and addition computations performed in a space that is commutative (real numbers, for example), permit some transposition errors to pass undetected.

It can therefore be appreciated that a need exists for an improved method and system to produce a check digit that will markedly increase the likelihood of detecting transposition errors that frequently occur upon re-entry of a numeric sequence.

SUMMARY OF THE INVENTION

It is therefore an object of the invention to provide an improved method and system for verifying the accuracy of a numerical sequence.

It is another object of the invention to provide a method and system for acquiring a check digit associated with a numeric sequence.

It is still another object of the invention to provide an improved check digit method and system that utilize non-commutative matrix multiplication of digits within a numeric sequence to enhance detection of transposition errors.

The above and other objects are achieved as is now described. A method and system are disclosed for obtaining a check digit to identify a given numeric sequence of n digits and to verify the accuracy of subsequent entries of the numeric sequence. First, a numeric sequence of n digits is distributed among elements of at least two matrices. Next, the matrices are multiplied together, thereby obtaining a resultant matrix having m elements. Finally, a check digit is derived from the m elements of the resultant matrix, which may be utilized to identify the numeric sequence and verify the accuracy of subsequent entries of the numeric sequence.

BRIEF DESCRIPTION OF THE DRAWINGS

The novel features believed characteristic of the invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DETAILED DESCRIPTION OF PREFERRED EMBODIMENT

Self-checking numbers are utilized in many applications as a means of ensuring data accuracy or preventing fraud. Upon receiving such a number as input, a verification is performed to validate the number. These checking numbers are commonly referred to as "check digits" and will be referred to as such in the following description.

The present invention introduces an improved method and system for obtaining a check digit. A common mistake by which a numeric sequence may be incorrectly entered occurs when pairs of digits or pairs of fields within the sequence are switched when the sequence is transcribed. This type of mistake will be referred to generally as a "transposition error". By utilizing matrix multiplication, a check digit generated by the method and system of the present invention is less susceptible to allowing transposition errors to pass undetected.

Figure 1:
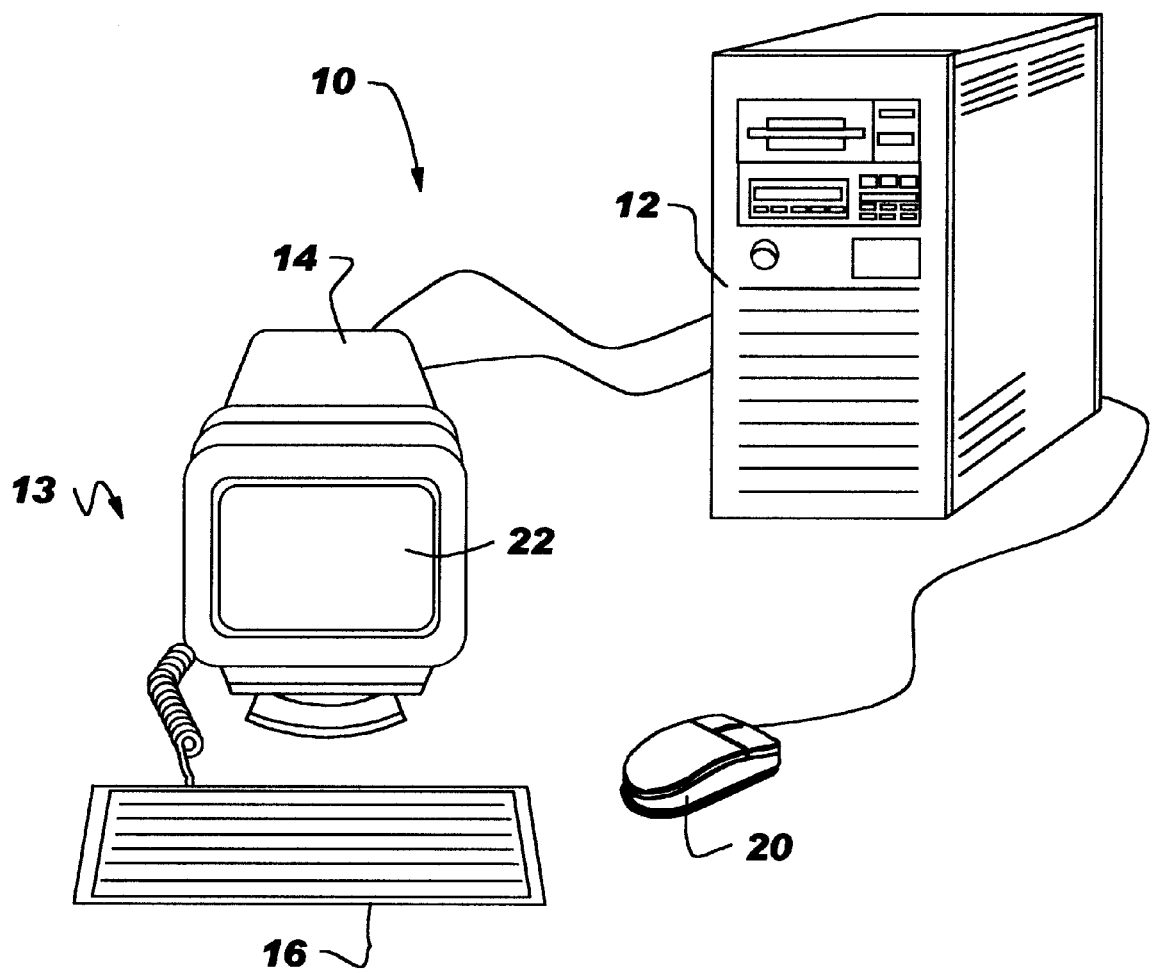
FIG. 1 illustrates a pictorial representation of a data processing system with which the method and system of the present invention may be implemented.

With reference now to FIG. 1, there is depicted a pictorial representation of a data processing system 10 with which check digits may be generated and verified in accordance with the teachings of the present invention. As illustrated, data processing system 10 comprises a workstation 12 to which one or more peripheral devices 13 are connected. Workstation 12 may comprises a high performance multi-processor computer, such as the RISC System/6000, available from International Business Machines Corporation (IBM), or a personal computer. Workstation 12 preferably includes nonvolatile and volatile internal storage for storing software applications comprising numeric computation tools, which can be utilized to generate and verify check digit information in accordance with the method and system of the present invention. As depicted, peripheral devices 13 are comprised of a display device 14, a keyboard 16, and a mouse 20. Software applications executed within workstation 12 preferably display a graphic user interface (GUI) within display screen 22 of display device 14 with which a user can interact utilizing a keyboard 16 and mouse 20. Thus, by entering appropriate inputs utilizing keyboard 16 and mouse 20, the user may read, transcribe and re-enter numeric sequences. A means for verifying the accuracy of the user's re-entry of a given numeric sequence is provided by the method and system described further herein below.

Figure 2:
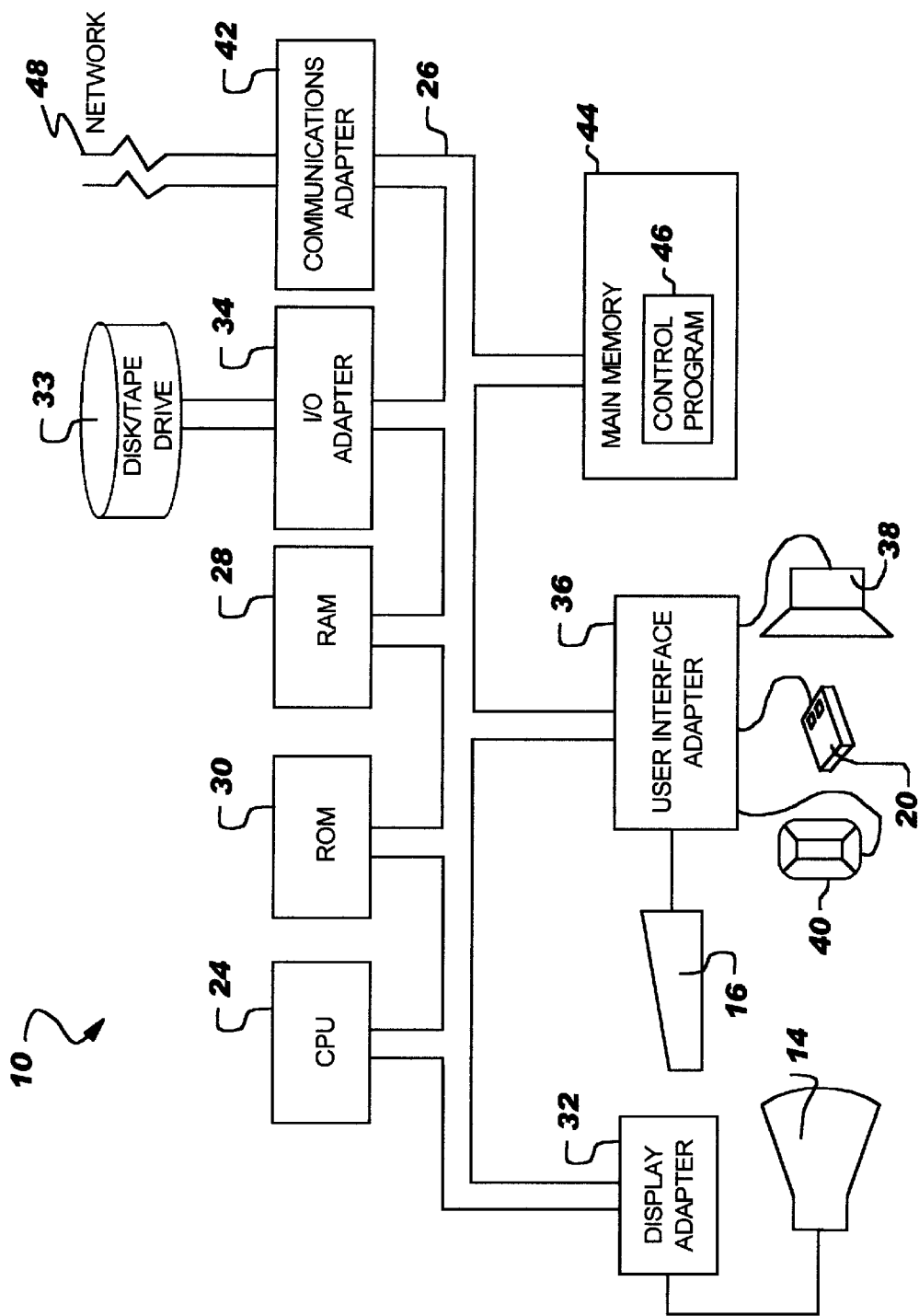
FIG. 2 depicts a representative hardware environment of the data processing system illustrated in FIG. 1.

FIG. 2 depicts a representative hardware environment of data processing system 10 illustrated in FIG. 1. In FIG. 1 and FIG. 2, like parts are identified by like numbers. Data processing system 10 in FIG. 2 is thus a configuration that includes all functional components of a computer and its associated hardware. Data processing system 10 includes a Central Processing Unit ("CPU") 24, such as a conventional microprocessor, and a number of other units interconnected via system bus 26. CPU 24 includes a portion of data processing system 10 that controls the operation of the entire computer system, including executing the arithmetical and logical functions contained in a particular computer program. Although not depicted in FIG. 2, CPUs such as CPU 24 typically include a control unit that organizes data and program storage in a computer memory and transfers the data and other information between the various parts of the computer system. Such CPUs also generally include an arithmetic unit that executes the arithmetical and logical operations, such as addition, comparison, multiplications and so forth. Such components and units of data processing system 10 can be implemented in a system unit such as workstation 12 of FIG. 1.

Data processing system 10 further includes random-access memory (RAM) 28, read-only memory (ROM) 30, display adapter 32 for connecting system bus 26 to display device 14, and I/O adapter 34 for connecting peripheral devices (e.g., disk and tape drives 33) to system bus 26. RAM 28 is a type of memory designed such that the location of data stored in it is independent of the content of such data. Also, any location in RAM 28 can be accessed directly without having to work through from the beginning. ROM 30 is a type of memory that retains information permanently and in which the stored information cannot be altered by a program or normal operation of a computer.

Display device 14 provides the visual output of data processing system 10. Display device 14 can be a cathode-ray tube (CRT) based video display well-known in the art of computer hardware. However, with a portable or notebook-based computer, display device 14 can be replaced with a liquid crystal display (LCD) based or gas plasma-based flat-panel display. Data processing system 10 further includes user interface adapter 36 for connecting keyboard 16, mouse 20, speaker 38, microphone 40, and/or other user interface devices, such as a touch-screen device (not shown), to system bus 26. Speaker 38 is one type of audio device that may be utilized in association with the method and system provided herein to assist computer users entering numeric sequences, in obtaining feedback from information received by data processing system 10 regarding entry failures, errors, and discrepancies. Communications adapter 42 connects data processing system 10 to a computer network, such as a Local Area Network (LAN) 48. Although data processing system 10 is shown to contain only a single CPU and a single system bus, it should be understood that the present invention applies equally to computer systems that have multiple CPUs and to computer systems that have multiple buses that each perform different functions in different ways.

Data processing system 10 also includes an interface that resides within a machine-readable media to direct the operation of data processing system 10. Any suitable machine-readable media may retain the interface, such as RAM 28, ROM 30, a magnetic disk, magnetic tape, or optical disk (the last three being located in disk and tape drives 33). Any suitable operating system and associated interface (e.g., Microsoft Windows) may direct CPU 24. For example, the AIX operating system and AIX Windows windowing system can direct CPU 24. Other technologies also can be utilized in conjunction with CPU 24, such as touch-screen technology or human voice control.

Those skilled in the art will appreciate that the hardware depicted in FIG. 2 may vary for specific design applications and network configurations. In addition, main memory 44 is connected to system bus 26, and includes a control program 46. Control program 46 resides within main memory 44, and contains instructions that, when executed on CPU 24, carries out the operations depicted in FIG. 4 described herein.

It is important to note that, while the present invention has been, and will continue to be, described in the context of a fully functional computer system, those skilled in the art will appreciate that the present invention is capable of being distributed as a program product in a variety of forms, and that the present invention applies equally regardless of the particular type of signal-bearing media utilized to actually carry out the distribution. Examples of signal-bearing media include: recordable-type media, such as floppy disks, hard disk drives, and CD ROMs, and transmission-type media such as digital and analog communication links.

Figures 3A, 3B, 3C:
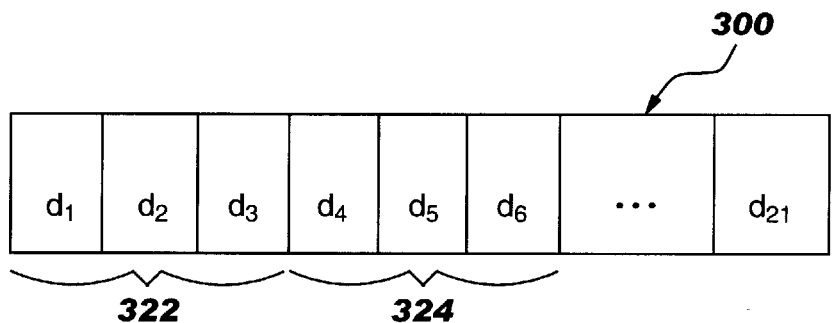
FIG. 3A illustrates an exemplary numeric sequence upon which the method and system of the present invention may be advantageously utilized.
FIG. 3B depicts exemplary input and resultant matrices that may be utilized in accordance with a preferred embodiment of the present invention.
FIG. 3C illustrates an exemplary means of calculating a check digit utilizing the elements of the resultant matrix of FIG. 3B in accordance with the teachings of the present invention.

With reference now to FIG. 3A, an exemplary numeric sequence 300 is illustrated upon which the method and system of the present invention may be advantageously utilized. Numeric sequence 300 includes 21 digits labeled "d1" through "d21" and may represent an encoded output result of a computation or measurement. A numeric sequence such as numeric sequence 300 may be obtained from execution of an error diagnostic code. Numeric sequence 300 includes several fields including a first field 322 and a second field 324. As seen in the depicted example, first field 322 is comprised of digits d1 through d3. Similarly, second field 324 is comprised of digits d4 through d6.

Each digit within numeric sequence 300 is significant both with respect to the numerical value of the digit, and also with respect to its relative position within the sequence. Numeric sequence 300 may be required to be transcribed from its originating medium, such as a computer display screen, to an another information handling system, such as an input device into another computer system. In order to prevent a transcription error from remaining undetected and causing downstream errors, a check digit derived in accordance with the method and system of the present invention, will be appended to numeric sequence 300. Information regarding the numeric value of each digit and its relative position within numeric sequence 300 is often included in conventional methods of calculating check digits. However, multiplying "position" information with "value" information to derive a check digit, introduces a significant statistical possibility that transposition errors will pass undetected. This problem is particularly likely to occur when fields comprised of more than one digit, such as fields 322 and 324, are transposed when a sequence is transcribed. The present invention alleviates this problem by multiplying digits comprising a numeric sequence among themselves utilizing a non-commutative matrix multiplication scheme as described further herein below.

FIG. 3B depicts exemplary input and resultant matrices that may be utilized in accordance with a preferred embodiment of the present invention. Input matrix 310 has three rows and four columns and is therefore a "3×4" matrix which may be multiplied by a "4×3" matrix such as input matrix 312. As seen in FIG. 3B, the elements within input matrices 310 and 312 include all of the digits within numeric sequence 300. It may often be the case that the number of digit positions within a numeric sequence is not the same number as that required to entirely fill the elements of two mutually multiplicable matrices. Such is the case in the example depicted in FIGS. 3A and 3B, in which numeric sequence 300 includes 21 digits while input matrices 310 and 312 have a combined total of 24 elements.

Therefore, as illustrated in FIG. 3B, matrix 312 has been "padded" with a first row 313 comprised of one's. A row or column comprised entirely of one's will be referred to hereinafter as an "identity row" or "identity column". It should be noted that the method of padding depicted in FIG. 3B is only one of many possible methods that may be implemented consistent with the scope of the present invention. For example, first row 313 within matrix 312 and third column 315 within matrix 310, may be switched such that third column 315 would be an identity column, and first row 313 would be comprised of digits "d11 d19 d16". Given the nature of matrix multiplication in which columns of the multiplicand matrix 310 are multiplied by rows of the multiplier matrix 312, padding should be performed by adding either an identity row to the multiplier matrix, or an identity column to the multiplicand matrix. In this manner, none of the constituent elements of resultant matrix 314 are derived simply by adding four digits of numeric sequence 300 as would be the case if an identity column was utilized to pad matrix 312.

In the preferred embodiment depicted in FIGS. 3A and 3B, the digits comprising numeric sequence 300 have been distributed within matrices 310 and 312 such that neighboring digits (d1 and d2, for example) will not be multiplied together when matrix 310 is multiplied by matrix 312. As long as this condition is satisfied, there may or may not be a discernible pattern in how the digits within numeric sequence 300 are otherwise distributed within matrices 310 and 312. A random number generating computer program stored within control program 46 may be utilized to implement a random distribution of the numbers of numeric sequence 300 within input matrices 310 and 312 such that the protection against "pattern" errors often caused by transpositions is provided. The distribution thus generated may then be reviewed and corrected as necessary to ensure that neighboring digits within numeric sequence 300 will not be multiplied together during the subsequent matrix multiplication.

After the numbers within numeric sequence 300 have been distributed within input matrices 310 and 312 in conformity with the aforementioned distribution scheme, resultant matrix 314 is obtained by multiplying matrix 310 by matrix 312. The details regarding how matrix multiplication is performed, as well as the fact that matrix multiplication is non-commutative, are well known in the art and are incorporated herein by reference.

Once the input distribution scheme for input matrices 310 and 312 has been determined, it must be preserved for verification of subsequent re-entries. This is because unlike other check digit methods which embed "position" information to a check digit by performing a sequential multiplicative summation, the method and system of the present invention generates its own original digit mapping scheme. Therefore, a preferred embodiment of the present invention will include a preliminary step in which an input distribution scheme, similar to that depicted within matrices 310 and 312, is generated and stored within a data processing system, such as data processing system 10.

Referring now to FIG. 3C, a formula 316 is depicted by which the elements of resultant matrix 314 are utilized to calculate a check digit. The steps required to implement formula 316 may be performed within CPU 24 in accordance with instructions residing within RAM 28 as an exemplary means of calculating a check digit from the elements of the resultant matrix 314 in accordance with the teachings of the present invention. Formula 316 includes a weighted transverse summation 318 of the elements of resultant matrix 314. A modulus 320 is set to a predetermined value which, in a preferred embodiment of the present invention, is the prime number closest in value to the largest check digit desired. For example, if the largest check digit desired for a particular application is "99", then modulus 320 would assume a value of "97".

Figure 4:
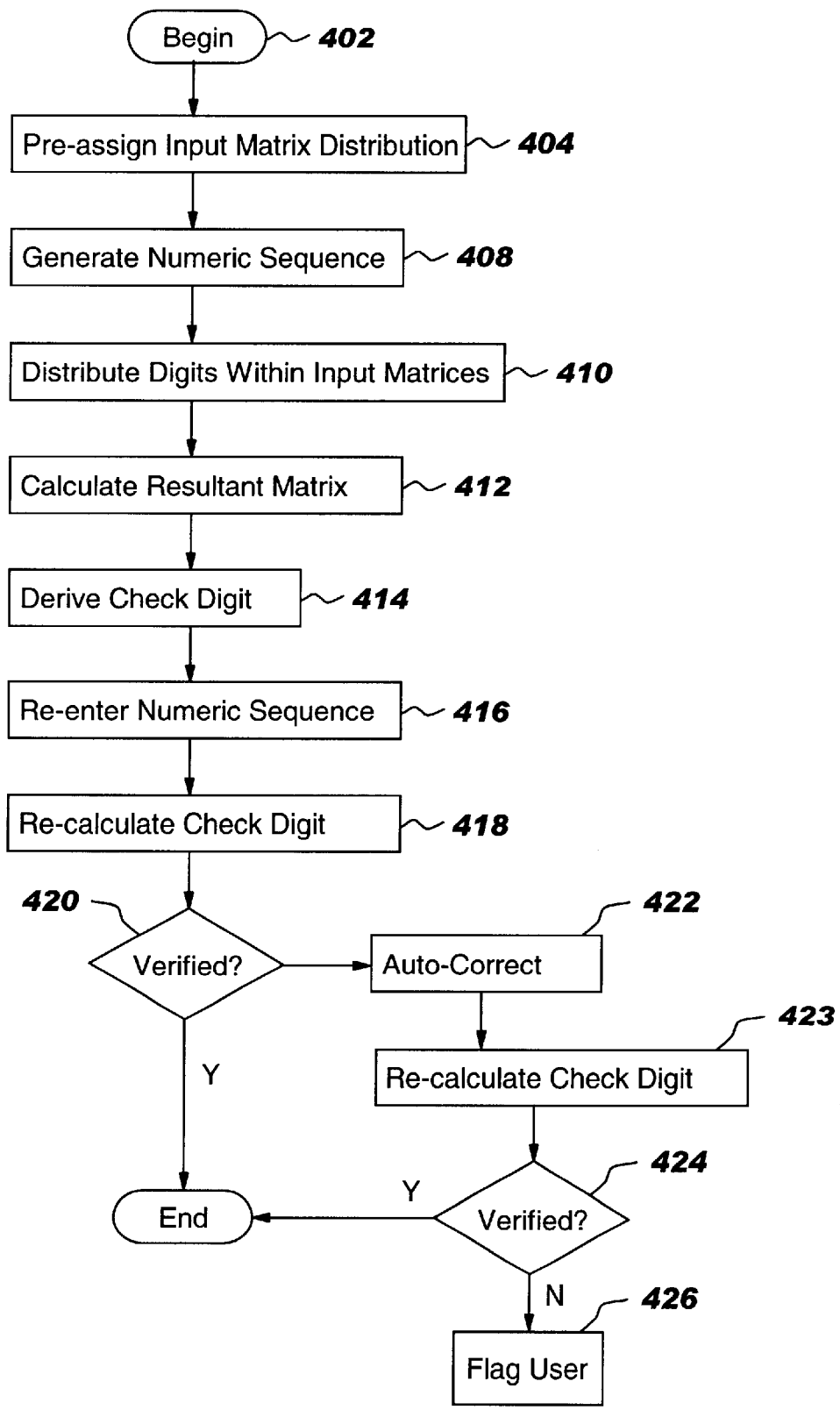
FIG. 4 is a high level flow diagram depicting a process for obtaining and utilizing a check digit for a numeric sequence in accordance with the teachings of the present invention.

Referring now to FIG. 4, there is illustrated a high level flow diagram of a process for obtaining a check digit for a numeric sequence in accordance with the teachings of the present invention. The process begins at step 402 and proceeds to step 404 which illustrates pre-assignment of an input distribution scheme. In a preferred embodiment of the method and system of the present invention, the distribution scheme will share the characteristics of the distribution scheme described with reference to input matrices 310 and 312 of FIG. 3B. That is, the length of input numeric sequences will be anticipated, and at least two input matrices will be generated. The total number of elements within the input matrices will conform as closely as possible to the number of digits within each of the anticipated numeric sequences. The element positions within the input matrices will each be assigned to receive a particular digit position within the sequence. This assignment will, in a preferred embodiment, ensure that no two neighboring digits within the numeric sequence are multiplied together when the multiplicand input matrix is multiplied by the multiplier matrix. For cases in which the number of elements within the input matrices exceeds the number of digits in each of the anticipated numeric sequences, the pre-assigned distribution scheme will include "padding" in the form of an identity row included within the multiplier matrix or an identity column included within the multiplicand matrix. After being defined, this distribution scheme must be recorded, such that after a check digit is initially derived as depicted in subsequent steps of this process, the accuracy of re-entries of the sequence may be verified.

The process continues at step 408 which depicts the generation of a particular numeric sequence. As explained previously, there are numerous possible ways by which such a numeric sequence may be generated or otherwise obtained. Information encoded within numeric fields that occur in error diagnostic codes is an example of a numeric sequence having a fixed, predictable number of digits whose numeric value and relative position within the sequence are both significant. Next, as illustrated at step 410, each digit within the sequence generated at step 408, is distributed within at least two input matrices in accordance with the distribution scheme assigned at step 404. A resultant matrix is then obtained by multiplying the input multiplicand matrix by the input multiplier matrix as illustrated at step 412.

The process proceeds to step 414 which illustrates the derivation of the check digit that will be appended to the numeric sequence as a sequence identifier. As described with reference to FIG. 3C, the check digit will result from a weighted transverse summation of the elements of the resultant matrix calculated at step 412. Although not depicted in the process of FIG. 4, a modulus will have been pre-determined in order to perform the calculation depicted at step 414. Steps 404 through 414 illustrate a method for obtaining a check digit that is more robust less susceptible to missing transposition errors than check digits obtained utilizing conventional methods.

After a check digit is initially calculated for the numeric sequence obtained at step 408, the process resumes at step 416 which illustrates a re-entry of the sequence which now includes the check digit. The check digit will be appended to the end of the sequence so as not to interfere with the pre-assigned input distribution scheme which has been pre-served in order to perform verification of subsequent entries of the sequence. After the sequence has been re-entered, and as depicted at step 418, a check digit re-calculation will be performed utilizing the method depicted in steps 410, 412 and 414. Thereafter, as illustrated at step 420, a verification of the re-entry is performed. This verification will comprise comparing the original check digit with the check digit re-calculated as depicted at step 418. As illustrated at step 428 the process terminates if the verification is affirmative. If however, the verification performed at step 420 indicates an inconsistency between the original and the re-calculated check digit, an auto-correction tool is initiated as depicted at step 422. The auto-correction tool will examine the discrepancy discovered at step 420 and attempt to diagnose and correct the sequence that has been incorrectly re-entered. After the auto-correction has been attempted, then as illustrated at steps 423 and 424, a re-calculation of the check digit is again performed and verified. If the verification depicted at step 424 indicates that the auto-correction was successful in restoring the original sequence, the process terminates at step 428. If the verification indicates that the auto-correction attempt was unsuccessful, the user is flagged as depicted at step 426.

Preferred implementations of the invention include implementations as a computer system programmed to execute the method or methods described herein, and as a program product. According to the computer system implementation, sets of instructions for executing the method and methods are resident in RAM of one or more computer systems configured generally as described above. Until required by the computer system, the set of instructions may be stored as a computer-program product in another computer memory, for example, in a disk drive (which may include a removable memory such as an optical disk or floppy disk for eventual utilization in disk drive).

The computer-program product can also be stored at another computer and transmitted when desired to the user's workstation by a network or by an external communications network. One skilled in the art can appreciate that the physical storage of the sets of instructions physically changes the medium upon which it is stored so that the medium carries computer-readable information. The change may be electrical, magnetic, chemical, or some other physical change. While it is convenient to describe the invention in terms of instructions, symbols, characters, or the like, the reader should remember that all of these and similar terms should be associated with the appropriate physical elements. Thus, a method for implementing the present invention as depicted in FIG. 4, can be accomplished with a computer-aided device. In such a method, data stored in a memory unit of a data-processing system such as data-processing system 10, can represent steps in a method for implementing a preferred embodiment of the present invention.

While the invention has been particularly shown as described with reference to a preferred embodiment, it will be understood by those skilled in the art that various changes in form and detail may be made therein without departing from the spirit and scope of the invention. It is therefore contemplated that such modifications can be made without departing from the spirit or scope of the present invention as defined in the appended claims.

What is claimed is:

1. A method for obtaining a check digit to identify a given numeric sequence of n digits, where n is a number greater than or equal to two, and to verify the accuracy of subsequent entries of said numeric sequence, said method comprising the steps of:

distributing a numeric sequence of n digits among elements of at least two matrices;

multiplying said at least two matrices, thereby obtaining a resultant matrix having m elements; and deriving a check digit from said m elements of said resultant matrix, said check digit to be utilized to identify said numeric sequence and verify the accuracy of subsequent entries of said numeric sequence.

2. The method of claim 1 wherein said step of distributing a numeric sequence of n digits among elements of at least two matrices, is preceded by the step of generating a numeric sequence of n digits, where n is a number greater than or equal to two.

3. The method of claim 1 wherein said step of distributing said numeric sequence is preceded by the step of pre-assigning an input distribution scheme for the elements of said at least two matrices.

4. The method of claim 3 wherein said step of pre-assigning an input distribution scheme further comprises anticipating the number of digits, n, within said numeric sequence.

5. The method of claim 4 wherein said step of pre-assigning an input distribution scheme further comprises determining column and row dimensions of said at least two matrices in accordance with n.

6. The method of claim 3 wherein said step of pre-assigning an input distribution scheme comprises arranging said elements of said at least two matrices such that during said step of multiplying said at least two matrices, such that adjoining digits within said numeric sequence are not multiplied together.

7. The method of claim 3 wherein said step of pre-assigning an input distribution scheme is performed according to a pre-determined random distribution scheme.

8. The method of claim 1 wherein said step of deriving a check digit comprises performing a weighted transverse summation in accordance with the relation:

$$\sum_{}^{M} C_{ij}(10i+j) \bmod P,$$

wherein $C_{ij}$ designates elements within said resultant matrix, $(10i+j)$ the weights, M the total number elements within said resultant matrix, and P is a prime integer serving as a modulus.

9. A program product stored in signal bearing media for obtaining a check digit to identify a given numeric sequence of n digits, where n is a number greater than or equal to two, and to verify the accuracy of subsequent entries of said numeric sequence, said program product comprising:

instruction means stored in signal bearing media for distributing a numeric sequence of n digits among elements of at least two matrices;

instruction means stored in signal bearing media for multiplying said at least two matrices, thereby obtaining a resultant matrix having m elements; and instruction means stored in signal bearing media for deriving a check digit from said m elements of said resultant matrix, said check digit to be utilized to identify said numeric sequence and verify the accuracy of subsequent entries of said numeric sequence.

10. The program product of claim 9 further comprising instruction means stored in signal bearing media for generating a numeric sequence of n digits, where n is a number greater than or equal to two.

11. The program product of claim 9 further comprising instruction means stored in signal bearing media for pre-assigning an input distribution scheme for the elements of said at least two matrices.

12. The program product of claim 11 wherein said instruction means for pre-assigning an input distribution scheme further comprises instruction means for anticipating the number of digits, n, within said numeric sequence.

13. The program product of claim 12 wherein said instruction means for pre-assigning an input distribution scheme further comprises instruction means for determining column and row dimensions of said at least two matrices in accordance with n.

14. The program product of claim 11 wherein said instruction means for pre-assigning an input distribution scheme comprises instruction means for arranging said elements of said at least two matrices such that during multiplication of said at least two matrices, adjoining digits within said numeric sequence are not multiplied together.

15. The program product of claim 9 wherein said instruction means for deriving a check digit comprises instruction means for performing a weighted transverse summation in accordance with the relation:

$$\sum_{}^{M} C_{ij}(10i+j) \bmod P,$$

wherein $C_{ij}$ designates elements within said resultant matrix, $(10i+j)$ the weights, M the total number elements within said resultant matrix, and P is a prime integer serving as a modulus.

\* \* \* \* \*